United States Patent

Raschke

[15] 3,640,555
[45] Feb. 8, 1972

[54] CONNECTOR FOR HANDTOOL SUSPENSION SYSTEM

[72] Inventor: Herbert A. Raschke, Greenbrae, Calif.
[73] Assignee: E. D. Bullard Company, Sausalito, Calif.
[22] Filed: Oct. 24, 1969
[21] Appl. No.: 869,223

[52] U.S. Cl. ..............................287/103 A, 287/76, 248/17, 248/331
[51] Int. Cl. .........................................................F16b 7/00
[58] Field of Search ..........................248/17, 317, 331, 339; 24/221 K; 287/76, 103 A; 294/78, 82; 77/36; 285/402

[56] References Cited

UNITED STATES PATENTS

| 249,177 | 11/1881 | Healey | 294/82 X |
|---|---|---|---|
| 1,505,318 | 8/1924 | Berlow | 287/103 A |
| 2,157,153 | 5/1939 | Troche | 287/103 A X |
| 2,375,719 | 5/1945 | Wirkkala | 294/78 |

FOREIGN PATENTS OR APPLICATIONS

| 465,309 | 9/1928 | Germany | 287/103 A |
|---|---|---|---|

*Primary Examiner*—William H. Schultz
*Attorney*—Townsend & Townsend

[57] ABSTRACT

A coupling or connector is inserted as a segment of a tensively loaded support system for supporting the weight of heavy portable handtools. The coupling includes a male connector member and a female connector member which can be moved into and out of registry with one another in a first angular relation and locked together in a second angular relation to permit the coupling to transmit tensive loadings therethrough. The coupling members are completely removable from the handtool when uncoupled. Further, provision is made to securely lock the male and female connector members together to prevent inadvertent connector uncoupling when tensive loadings on the support system are rapidly changed during movement of the tool.

4 Claims, 10 Drawing Figures

INVENTOR
HERBERT A. RASCHKE
BY Townsend and Townsend
ATTORNEYS

INVENTOR
HERBERT A. RASCHKE
BY Townsend and Townsend
ATTORNEYS

CONNECTOR FOR HANDTOOL SUSPENSION SYSTEM

This invention relates to a connector or coupling for transmitting tensive loadings therethrough, which coupling or connector is particularly useful as a segment of a tensively loaded support system for supporting hand tools.

Modern portable tools frequently are of relatively heavy weight due to their self-contained power supplies, unitary casings, and attached working members. While such tools have the advantage of being portable, these tools when used for prolonged periods of time often cause their operators to become overly tired in supporting their weight. Frequently it is desired to suspend such tools from an overhead suspension system to remove all or a portion of their weight from the operator. With such overhead suspension, the energies of the operator can be used mainly for directing and maintaining the tool in its desired working position rather than supporting the tool weight.

In the overhead suspension of portable tools, it has been found desirable to use connectors or couplings which will enable the supported portable tools to be readily engaged and disengaged from their suspension systems. Standard tensively loadable couplings have been found unsatisfactory for this purpose. This is because suspended portable tools are often subjected to sudden movement towards and away from their support systems, which sudden movement can cause inadvertent disconnection of most standard tensively loadable couplings or connectors. Such inadvertent uncoupling can result in strain on, or injury to the operator, and damage to the tool through dropping.

An object of this invention is to provide a connector having male and female members which in a first angular relation can be moved into and out of registry one with the other and when in registry can be rotated to a second angular relation where they are securely locked and enabled to transmit tensive loadings therethrough.

An advantage of this coupling system is that it can be used in combination with a suspension system for supporting tools when in the coupled position, and at the same time can be readily uncoupled by simple rotation and retraction of the male and female members to permit the suspended tools to be readily transported to another working location.

A further object of this invention is to provide a tensively loaded coupling having its respective coupling members biased into their coupled positions.

An advantage of the biasing of these members into their coupled position is that the possibility of inadvertently uncoupling during sudden movement of a tool towards and away from its suspension system is eliminated.

A still further object of this invention is to provide a two-part male coupling member fabricated from a single casting mold and a two-part female coupling member fabricated from another single casting mold.

Yet an additional object of this invention is to provide for connection and disconnection of one of the connector members of the support system from its attached tool only when it is disengaged from its mating connecting member.

An advantage of this disengagement is that when a supported tool or other load is removed to a new working location, all parts of the connector can be removed therefrom, and remain with the tool suspension system.

Other objects, features and advantages of this invention will be more apparent after referring to the following specification and attached drawings in which.

Figure 1:
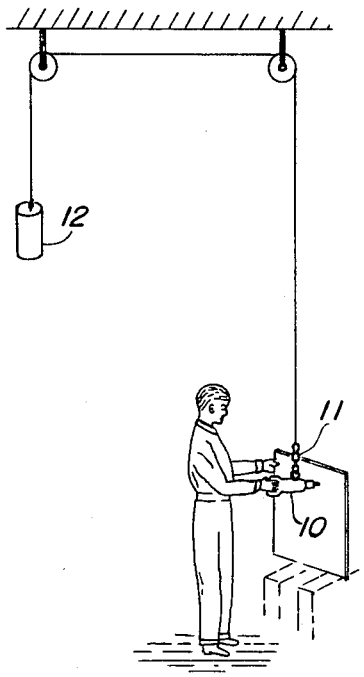
FIG. 1 is a schematic of a tool suspension system, illustrating the connector of this invention installed as a segment of the suspension system.

Referring to FIG. 1, a typical tool suspension system is illustrated. Tool 10 is shown supported by a support system having a cable connected through coupling 11 of this invention at one end. The cable is typically looped over a pair of pulleys and counterweighted by weight 12 at the opposite end. As is well know, by adjustment of the mass of counterweight 12, the support system can be adapted to provide varying support tensions for supporting tools 10 of varying sizes.

Figure 2:
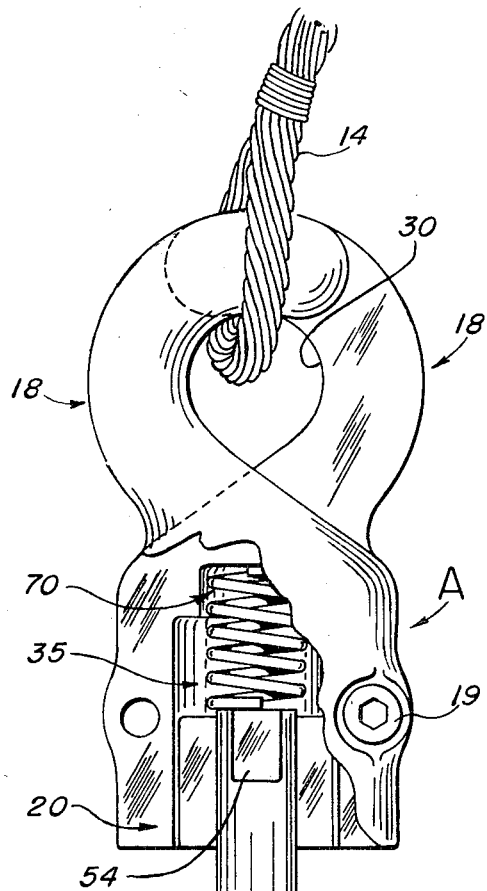
FIG. 2 is a side elevation illustrating the connector of this invention with the male and female members in the coupled position, the female connector member being shown in partial section.

With specific reference to FIG. 2, the connector of this invention is illustrated. Female connector housing A is shown joined to eye 14 spliced in the lower end of the cable adjacent tool 10. Male connector member B is illustrated secured to a pad eye 16 on portable tool 10. Male connector B is illustrated inserted interior of female connector A and rotated to its position of engagement with the female connector so that tensive loading of pad eye 16 relative to spliced eye 14 can be transmitted through the coupling.

Operation of this coupling can best be understood by first describing constructions of female connector A and male connector B.

Female connector A is fabricated from two identical castings 18, one of which castings is specifically illustrated in FIGS. 3 through 6. Casting 18 has a planar side 20 and a semicircular side 22. When two castings of the type illustrated in FIG. 2 are placed in back-to-back relation, planar side 20 of a first casting is placed against a planar side 20 of a second identical casting. This causes planar sides 20 together to form a concealed interfaCe interior of female coupling member A and allows the semicircular sides 22 of each casting to be exposed outwardly of the conjoined castings so that when the paired castings are placed together, they form an essentially cylindrical configuration.

Figure 4:
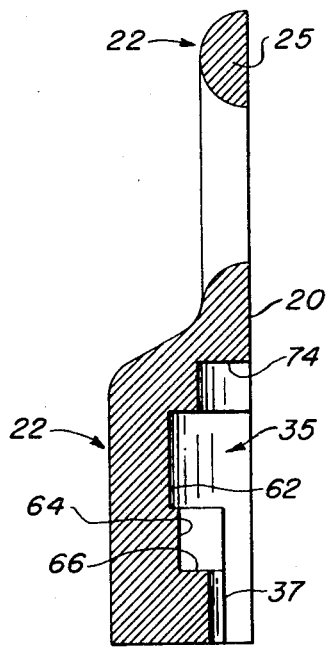
FIG. 4 is an end elevation section taken along lines 4—4 of FIG. 3.
Figure 3:
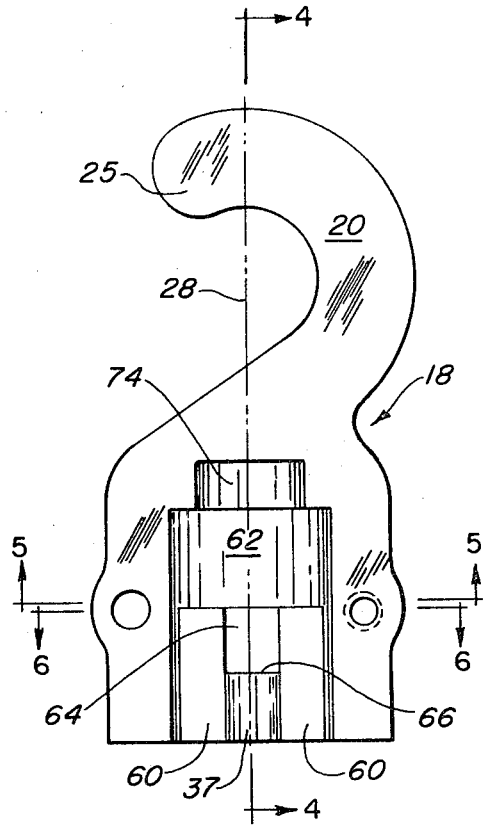
FIG. 3 is a side elevation illustrating one of the two identical castings utilized in fabricating the female connector member, the view here taken at the planar surfaCe of the casting which permits two such castings to be conjoined.

Referring to FIGS. 3 and 4, the upper section of casting 18 is provided with a J- or hook-shaped portion 25. As can be seen clearly in FIG. 3, the tip of the J or hook extends outwardly and beyond the longitudinal center line 28 of the casting. Referring to FIG. 2, when the respective castings 18 are fastened in back-to-back relation by Allen screws 19 at their planar sides 20, the J-shaped member 25 of each casting 18 together form an eye 30 through which other connections such as spliced eye 14 of the cable can be passed.

Casting 18 has its planar side 20 interrupted by a female concavity 35. This concavity, concentric about axis 28 of the casting, includes central bore 37 and three adjoining keyways for permitting entry and retraction of male coupling member B into and out of engagement with female coupling member A.

To understand the function of bore 37 and the three respective keyways, the configuration of male coupling member B must first be understood.

Figure 7:
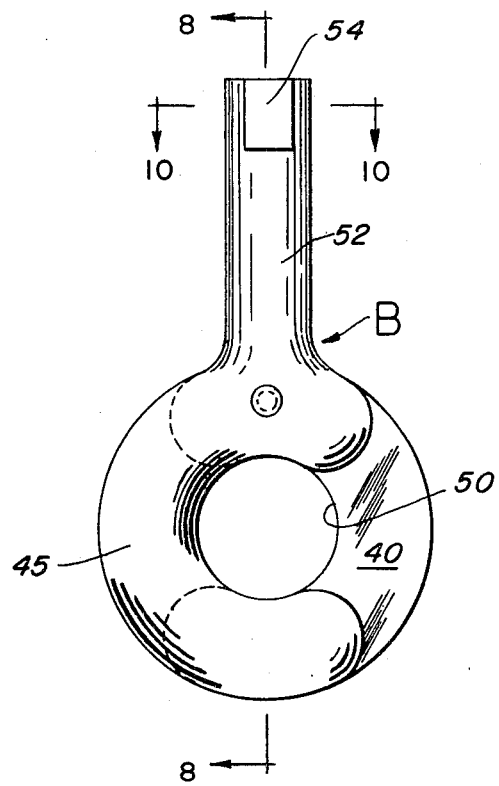
FIG. 7 is an elevation view of the male connector of this invention with the two identical male coupling castings pivotally conjoined in back-to-back relation.

Referring to FIGS. 7-10, male coupling member B is illustrated. Similar to female coupling member A, male coupling member B consists of two identical castings 38. Each casting is provided with a planar side 40 and a semicylindric side 42. Additionally, each casting 38 of male coupling member B is provided with a hooked or C-shaped lower portion 45. As can be seen in FIG. 7, when the castings are placed in back-to-back relation, the respective hooks 45 overlie one another and form together enclosed eye 50.

Figure 8:
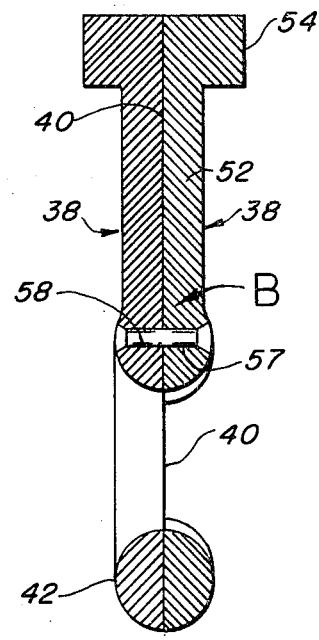
FIG. 8 is an end elevation section along line 8—8 of FIG. 7.

Extending upwardly from the hooked portion 45 of each casting 38 there is semicircular shank 52. Shank 52 at its end removed from book 45 includes pawl 54. Pawl 54 is a rectangular sectioned protuberance extending outwardly from the semicylindric side 42 of casting 38 normal to the plane of planar side 40. When two castings 38 are joined together as shown in FIG. 8, the section of shank 52 between hooked portion 45 and pawl 54 is circular. At pawl 54, the cross section is no longer circular but has the rectangular protuberance of pawl 54 protruding outwardly from both semicylindric sides 42 of the shank in a superimposed rectangular section on the circular section of the shank.

Figure 9:
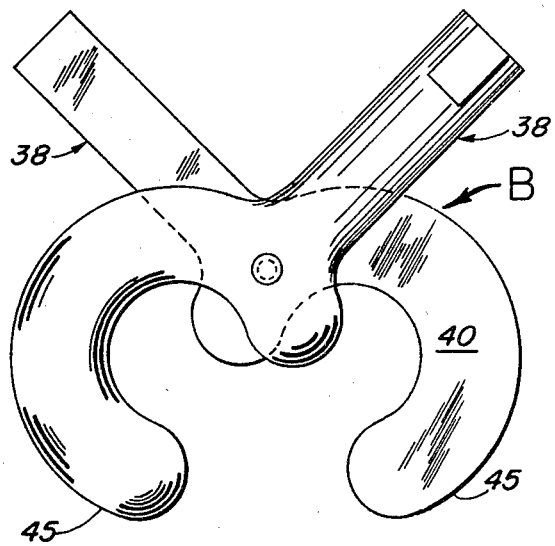
FIG. 9 is a side elevation view similar to FIG. 7 illustrating the two identical castings of the male connector moved to a position where the male connector can be engaged or disengaged from the pad eye shown in FIG. 2; and, FIG. 10 is a plan section taken along lines 9—9 of FIG. 7.
Figure 10:
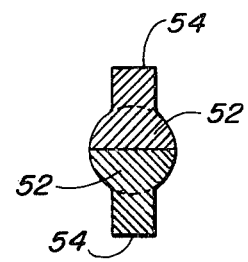

Conjunction of respective castings 38 in back-to-back relation at their planar surfaces 40 is provided by a pin 57. This pin extends through a flared aperture in each casting 38, permitting rotative movement between the respective castings 38 as illustrated in FIG. 9. When attachment of male coupling member B to a pad eye such as that illustrated in 16 is desired, hooked portions 45 of castings 38 are each rotated away from one another, castings 38 being slideable along their back-to-back planar surfaces 40 to cause the eye 50 to open. Thereafter, the male coupling B can be inserted over an eye and the respective castings 38 counter rotated to close the hook and secure the male coupling member B to the eye 16.

Having set forth the configuration and operation of the male coupling member B and in particular the cross-sectional configuration of shank 52 and pawl 54, the cooperation of the female concavity 35 of female coupling member A can now be set forth and understood.

Figure 6:
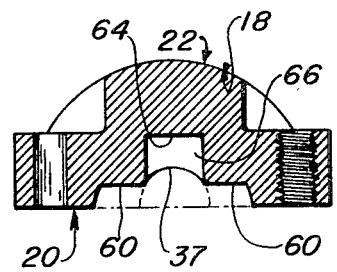
FIG. 6 is a bottom section taken along lines 6—6 of FIG. 3.

Referring to FIGS. 3, 4 and 6, it will be seen that casting 18 of female coupling member A defines therein semicylindric bore 37. As is shown schematically in broken lines in FIG. 6, the semicylindric cross section of bore 37 is slightly larger than the circular cross sections provided by the combined shanks 52 of castings 38 forming male coupling member B (see FIG. 10). In the absence of pawl members 54, it can be seen that male coupling member B at the respective shanks 52 of its castings can be freely inserted in and withdrawn from engagement interior of female coupling A.

In order to permit pawl 54 to enter into and be retracted from the interior of female aperture 35 in the conjoined castings 18 of coupling member A, it is necessary that bore 37 of each casting be complemented with first keyways 60. Keyways 60 are configured to permit longitudinal insertion of half the section of pawls 54 when shank 52 is within bore 37. Further, and as shown in FIGS. 2 and 7, it can be seen that when castings 18 are conjoined, keyways 60 together with bores 37 permit entry of and retraction of male coupling member B into and out of female coupling member A.

Once shanks 52 and pawls 54 are inserted interior of the female concavity 35, provision must be made to permit rotation of the pawls 54 for subsequent locking of the male coupling member B interior of the female coupling member A. To this end, casting 18 has configured at the upper end thereof, semicircular keyway 62 (see FIGS. 3, 4 and 5). Semicircular keyway 62 has a depth relative to bore 37 which will permit full rotation of male coupling member B at pawls 54 interior of female coupling member A. As is apparent, when the paired castings 18 are placed in back-to-back relation at their planar surface 20, keyway 62 will define an extended cylindrical volume interior of the female aperture 35; this aperture being sufficiently large to permit the rotation of pawls 54.

In addition to longitudinal keyway 60 and circular keyway 62, each casting is provided with a third longitudinally extending keyway 64 (see FIGS. 3, 4 and 6). Third keyway 64 commences at the lower surface of semicircular keyway 62 and extends partially downwardly towards the bottom of casting 18 terminating at shoulder 66. This keyway is given a section to accommodate the full section of pawl 54. As can be seen in FIG. 6, when castings 18 are fastened together, keyways 64 in cooperation with bores 37 define a cross-sectional aperture permitting partial retraction of male coupling member B from the interior of the female bore 35 of female coupling member A. Shoulder 66, however, arrests complete withdrawal and bears against the lower surface of pawls 54. It is the engagement between shoulders 66 and pawl 54 which permit the coupling of this invention to have tensive loads transmitted therethrough.

Operation of the coupling can now be readily understood. To insert shanks 52 and pawls 54 interior of female aperture 35 in female coupling member A, male coupling member B is rotated to an angular relation relative to female coupling member A ninety degrees from that shown in FIG. 2. This angular relation aligns pawl 54 on shanks 52 so that when the shanks 52 enter bore 37, the pawls each pass through and along keyway 60 interior of female coupling member A.

When shanks 52 and pawls 54 are inserted interior of female coupling member A, they pass into the vicinity of radial keyway 62. The male coupling member B, as inserted interior of the female coupling member A, can be rotated ninety degrees so that pawls 54 overlie the respective keyways 64. In this latter position the male coupling member B can be partially withdrawn from interior of the female coupling member A. Such withdrawing will continue until the lower portion of the pawl 54 seats on shoulder 66 defined at the end of keyways 64. As is apparent, this is the position illustrated in FIG. 1 wherein male coupling member B is locked interior of female coupling member A.

It can be noted that when male coupling member B is interior of female coupling member A, the sidewalls of bore 37 will prevent rotational movement between the respective shanks 52 and pawls 54 of the castings 38 comprising male coupling member B. In this position opening of the eye 50 defined by the male coupling member B will not be possible.

It has been found desirable in the construction of this connector to bias male coupling member B outwardly of the bore 35 of female connector A by means of a spring 70 illustrated specifically in the section of FIG. 1. Such a bias prevents rapid up and down movement of eye 16 relative to the overhead suspension system from causing inadvertent uncoupling of male connector B with respect to female connector A.

Figure 5:
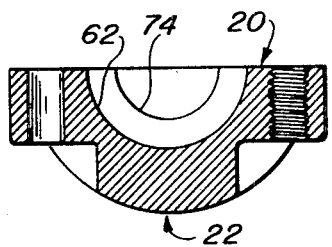
FIG. 5 is a plan section taken along lines 5—5 of FIG. 3.

Referring to FIGS. 3, 4 and 5, it will be seen that the upward portion of each casting 18 of female connector A is provided with a spring-containing concavity 74. Before the respective castings 18 are placed in back-to-back relation, spring 70 is compressed and placed within spring-containing concavity 74. By the expedient of selecting a helical spring 70 having a diameter exceeding that diameter of bore 37, but having a diameter less than that of concavity 74, the spring can be completely contained interior of the conjoined castings 18 which together comprise female coupling member A. During insertion and locking of male coupling member B interior of female coupling member A, pawls 54 will act to compress the spring. When members A and B are locked, spring 70 will bear on pawls 54 biasing male coupling member B in its locked position.

It should be apparent to the reader at this juncture that the invention herein illustrated will admit of a number of alternate embodiments. For example, the respective castings 18 and 38 herein forming together female coupling member A and male coupling member B could as well be forged, molded of plastic, machined or made of numerous alternate constructions. Likewise, the respective keyways could be configured within the female coupling member A it alternate angular and spatial locations. Additionally, while one embodiment of this invention has been shown and described, it will be apparent that other adaptations and modifications of this device could be made without departing from the true spirit and scope of the invention.

I claim:
1. A connector for insertion as a segment of a tensively loaded support system, said connector comprising: a female connector member having means for attachment to one portion of said support system at one end and defining a bore opening to the other end; a male connector member having means for attachment to said other portion of said (suspension) support system at one end and having a shank for extending into said bore at said opposite end; said male connector member being formed of two sections pivotally joined intermediate said attachment means and said shank for opening and closing said attachment means to permit engagement and disengagement from said support system only when said male connector is out of registry with said bore of said female connector; said sections each having a planar side for forming together at said planar side an interfaced interior of said male connector member; said shank having at least one protuberance extending outwardly therefrom substantially normal to the longitudinal axis of said shank; first keyway means defined in the longitudinal sidewalls of said bore for permitting insertion and retraction of said protuberance on said shank to and from a preselected position of penetration interior of said bore; a shoulder configured in the sidewalls of said bore for engaging said protuberance and permitting the tensive loading of said tensively loaded support system to be transmitted from said shank and protuberance to said female connector housing at said shoulder; and second keyway means having a portion thereof configured radially of the sidewalls of said bore at said preselected position of protuberance penetration for permitting rotation movement of said protuberance interior of said bore to and from engagement with said shoulder.

2. The invention of claim 1 and wherein said female connector member includes means for biasing said protuberance onto said shoulder when said male and female connector members are in said coupled position.

3. In a tensively loaded support system, a coupling for providing a detachable segment of said support system comprising: a male connector having first means for attachment to one portion of said support system at one end and a shank of preselected cross section extending away from said connecting means at the opposite end; a female connector having second means for attachment to the other portion of said (suspension) support system at one end and defining a bore for receiving and permitting rotation of said shank therein; said male connector member being formed of two sections pivotally joined intermediate said attachment means to permit engagement and disengagement from said support system only when said male connector is out of registry with said bore of said female connector; said sections each having a planar side performing together at said planar side and interface interior of said male connector member; a pawl attached to said shank and extending outwardly from the longitudinal axis thereof for providing a protruding cross section normal to the longitudinal axis of said shank at the point of attachment of said pawl to said shank; a first longitudinal keyway defined in said female connector in the sidewalls of said bore and extending from the opening of said bore to a preselected position of penetration of said pawl on said shank interior of said bore for providing together with said bore a cross section permitting insertion and removal of said shank and pawl into and out of said bore when said shank and pawl are at a first angular relation with respect to said bore; a second keyway configured radially about said bore in said female connection at said preselected position of penetration of said pawl on said shank for permitting rotation of said shank and pawl interior of said bore between said first angular relation of said shank and pawl with respect to said bore and a second angular relation of said shank and pawl with respect to said bore; a third longitudinal keyway in said female connector in the sidewalls of said bore extending from said second keyway partially outwardly of said bore for permitting partial retraction of said shank and pawl in said second angular relation from said preselected position of penetration, said third keyway defining a step at toward the outward end of said bore for seating said pawl on said shank whereby tensive loads can be transmitted through said pawl to said female connector.

4. The invention of claim 1, wherein said sections are identical.

* * * * *